US012566996B2

(12) United States Patent
Guelorget et al.

(10) Patent No.: US 12,566,996 B2
(45) Date of Patent: Mar. 3, 2026

(54) METHOD AND SYSTEM FOR ACTIVE LEARNING AND FOR AUTOMATIC ANALYSIS OF DOCUMENTS

(71) Applicant: Airbus Defence and Space SAS, Toulouse (FR)

(72) Inventors: Paul Guelorget, Toulouse (FR); Bruno Grilheres, Toulouse (FR); Titus Zaharia, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 1026 days.

(21) Appl. No.: 17/552,021

(22) Filed: Dec. 15, 2021

(65) Prior Publication Data

US 2022/0198334 A1 Jun. 23, 2022

(30) Foreign Application Priority Data

Dec. 18, 2020 (FR) ...................................... 2013638

(51) Int. Cl.
| | |
|---|---|
| *G06F 17/00* | (2019.01) |
| *G06F 7/00* | (2006.01) |
| *G06F 40/169* | (2020.01) |
| *G06N 20/00* | (2019.01) |

(52) U.S. Cl.
CPC ........... *G06N 20/00* (2019.01); *G06F 40/169* (2020.01)

(58) Field of Classification Search
CPC .............................. G06N 20/00; G06F 40/169
USPC ......................................................... 707/737
See application file for complete search history.

(56) References Cited

U.S. PATENT DOCUMENTS

| | | | | |
|---|---|---|---|---|
| 2010/0150448 A1* | 6/2010 | Lecerf | ................... | G06F 18/253 |
| | | | | 382/190 |
| 2019/0114370 A1* | 4/2019 | Cerino | ...................... | G06N 3/08 |
| 2019/0295000 A1* | 9/2019 | Candel | ................... | G06N 20/20 |
| 2020/0133964 A1* | 4/2020 | Lee | ......................... | G06N 5/041 |
| 2020/0175961 A1* | 6/2020 | Thomson | .............. | G10L 15/063 |

(Continued)

OTHER PUBLICATIONS

French Search Report; priority document.

(Continued)

*Primary Examiner* — Pavan Mamillapalli
(74) *Attorney, Agent, or Firm* — Greer, Burns & Crain, Ltd.

(57) ABSTRACT

An active learning and automatic analysis system executes a learning mode and a production mode in parallel. In production mode, it responds to requests for the automatic analysis of documents using a machine learning model trained with annotated documents. In learning mode, it receives and stores non-annotated documents, and updates a descriptor with information about the automatic analysis prediction for the non-annotated documents. It samples the stored non-annotated documents whose descriptor has been updated, and determines an order of the sampled non-annotated documents for annotation by an oracle. It distributes the annotated documents between documents to be used in either training mode or validation mode. It trains at least one randomly structured candidate machine learning model which, in the event of better performance in terms of validation, replaces the model used in production mode. New training is then performed while updating the descriptor in accordance with the replacement model.

10 Claims, 4 Drawing Sheets

(56) References Cited

U.S. PATENT DOCUMENTS

| | | | |
|---|---|---|---|
| 2020/0202171 A1 | 6/2020 | Hughes et al. | |
| 2020/0293712 A1* | 9/2020 | Potts | G16H 10/60 |
| 2021/0264025 A1* | 8/2021 | Givental | G06N 3/0464 |
| 2024/0404268 A1* | 12/2024 | Lin | G06V 10/82 |

OTHER PUBLICATIONS

S. Abuelwafa et al., "Unsupervised Exemplar-Based Learning for Improved Document Image Classification" IEEE Access; Sep. 18, 2019.

T. N. C. Cardoso et al., "Ranked Batch-Mode Active Learning" Universidade Federal de Minas Gerais, Brazil, Elsevier, Inc., 2016.

* cited by examiner

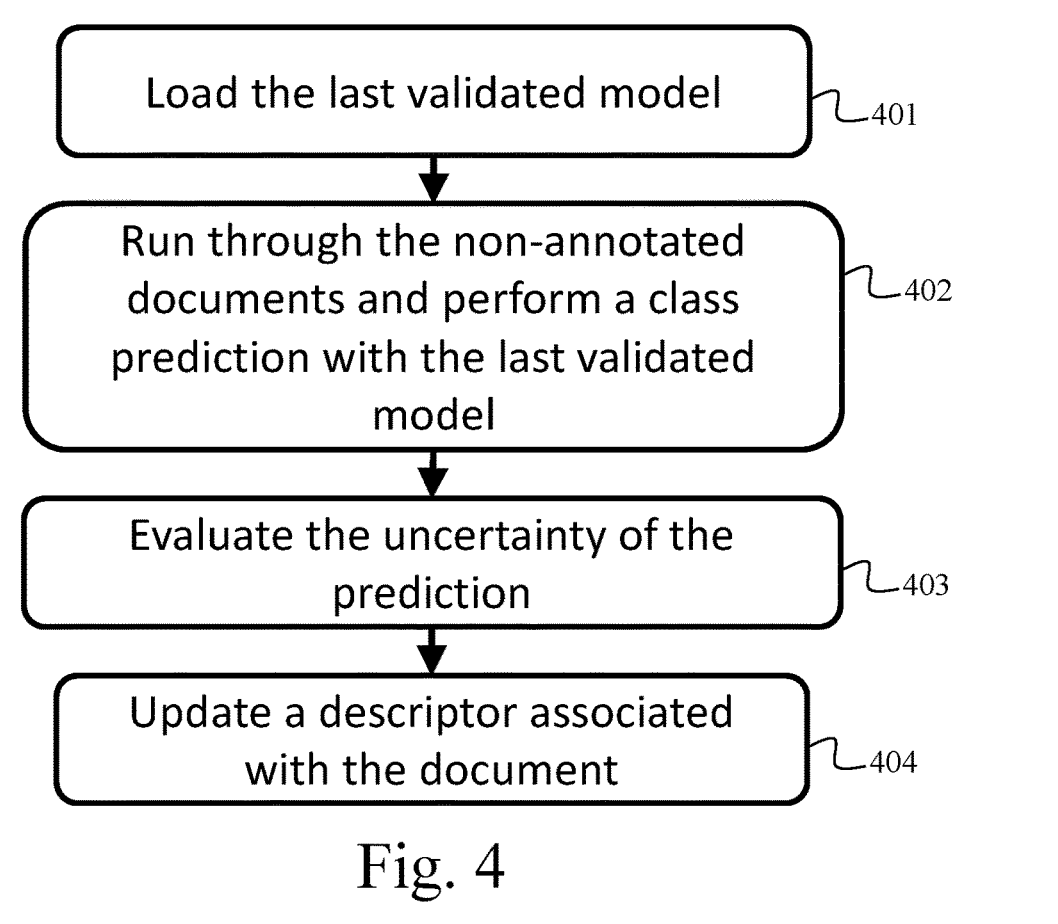

Load the last validated model — 401

Run through the non-annotated documents and perform a class prediction with the last validated model — 402

Evaluate the uncertainty of the prediction — 403

Update a descriptor associated with the document — 404

Fig. 4

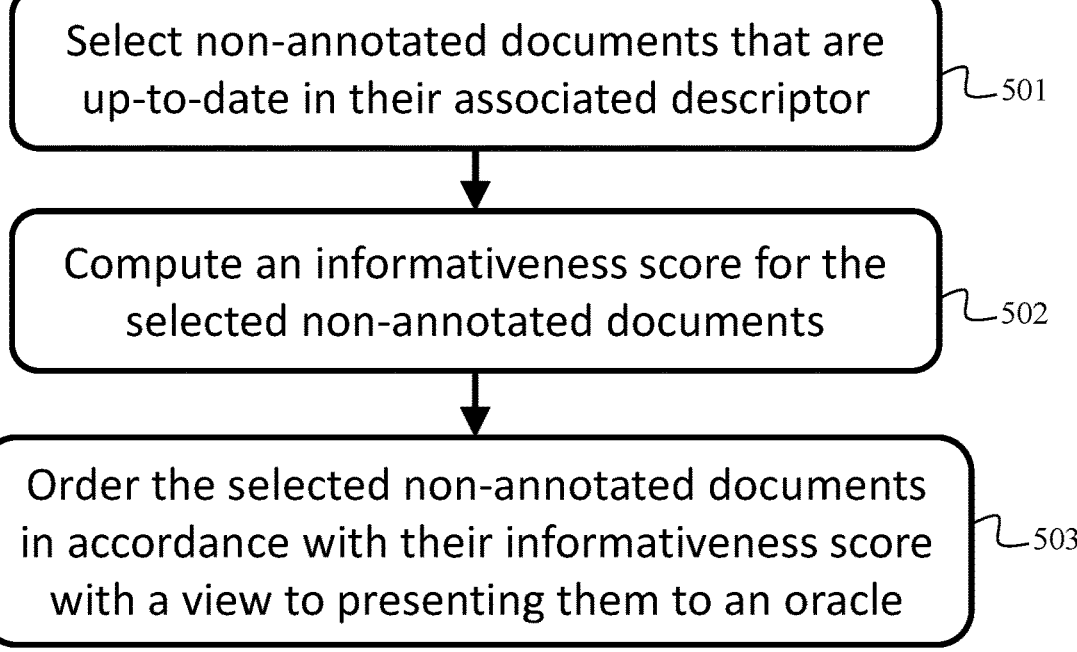

Select non-annotated documents that are up-to-date in their associated descriptor — 501

Compute an informativeness score for the selected non-annotated documents — 502

Order the selected non-annotated documents in accordance with their informativeness score with a view to presenting them to an oracle — 503

Fig. 5

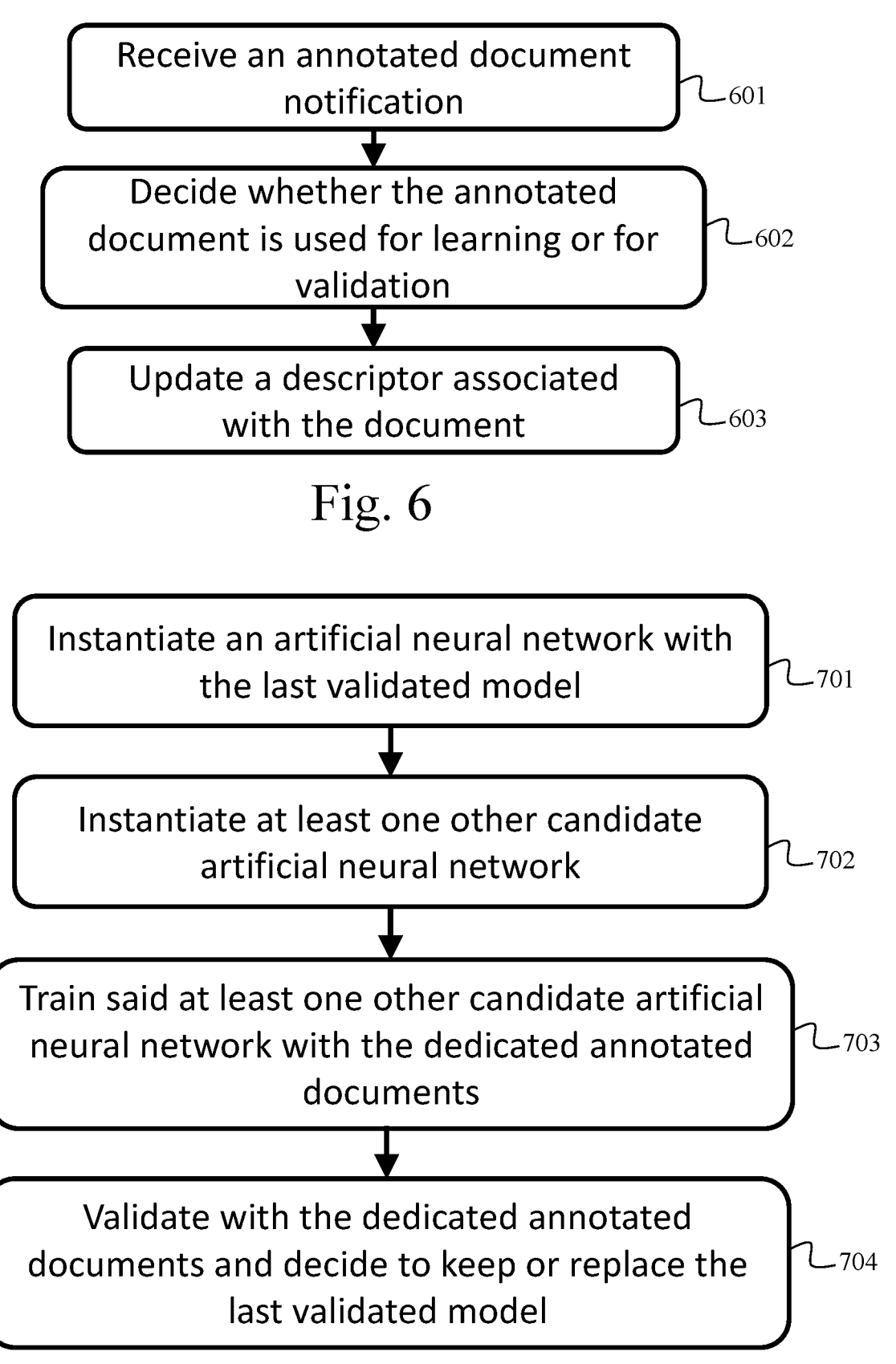

Receive an annotated document notification — 601

Decide whether the annotated document is used for learning or for validation — 602

Update a descriptor associated with the document — 603

Fig. 6

Instantiate an artificial neural network with the last validated model — 701

Instantiate at least one other candidate artificial neural network — 702

Train said at least one other candidate artificial neural network with the dedicated annotated documents — 703

Validate with the dedicated annotated documents and decide to keep or replace the last validated model — 704

Fig. 7

METHOD AND SYSTEM FOR ACTIVE LEARNING AND FOR AUTOMATIC ANALYSIS OF DOCUMENTS

CROSS-REFERENCES TO RELATED APPLICATIONS

This application claims the benefit of the French patent application No. 2013638 filed on Dec. 18, 2020, the entire disclosures of which are incorporated herein by way of reference.

FIELD OF THE INVENTION

The present invention relates to the field of active learning and the automatic analysis of documents, such as the field of classification using artificial neural networks.

BACKGROUND OF THE INVENTION

In the context of automatic analysis operations on documents (any formatted set of data, for example, text, image, audio and/or video), such as automatic classification operations on documents, active learning is a technique that aims to sample documents of an a priori unknown class (therefore documents that are said to be "non-annotated"), so as to submit them to a human expert, called an oracle. Not all non-annotated documents that are injected at input to train a machine learning model, such as an artificial neural network or a support vector machine SVM, are submitted to the oracle for manual classification. Only a subset of these documents is chosen automatically to be allocated (therefore classified) by the oracle. Reference is made to "semi-supervised" learning. This makes it possible to use essentially non-annotated documents (reference is also made to "untagged" documents) for learning, thereby reducing human involvement, along with the cost and the speed of implementation of an effective classifier.

To request the involvement of the oracle in a manner as relevant as possible, the system predicts a classification of the non-annotated documents and typically determines a document informativeness and classification uncertainty score. The system then uses this score to order the non-annotated documents, thereby making it possible to submit the non-annotated documents to the oracle for which the annotation should theoretically be most beneficial for learning.

Although active learning makes it possible to speed up the implementation of an effective classifier by minimizing the human resources required to annotate documents, the fact still remains that learning nowadays successively requires: (a) training the machine learning model, (b) analyzing the automatic classification of the non-annotated documents, (c) sampling the non-annotated documents, (d) annotating one or more documents, (e) adding new documents at input of the learning and reiterating steps (a) to (d) until the configuration of the machine learning model is stabilized and validated using a dedicated set of annotated documents. In such a successive process, step (d) is particularly limiting since it is time-consuming and subject to the oracle being available. It should also be noted that the formation of the validation set also involves a cost in terms of annotation.

Besides the drawback of remaining time-consuming, learning obliges an artificial intelligence system supplier to work closely with end users of these systems so as to develop the configuration of the machine learning model for better performance and to take into account new types of data (for example to manage seasonality in images, to introduce new data schemes to be recognized, etc.). However, these systems may be intended to process confidential documents, and it is therefore desirable to provide a solution that makes it possible to automatically generate and make available the best available model while using the machine learning model, without having to resort to another intervention by the artificial intelligence system supplier. The confidentiality of the processed documents would thus be ensured with greater ease. It is also desirable to provide a solution that is easy to implement and inexpensive, and which is, above all, able to be implemented by a non-expert machine learning user.

SUMMARY OF THE INVENTION

What is proposed is a method implemented by an active learning and automatic analysis system, the method executing a learning mode and a production mode in parallel, the production mode including: responding to requests for the automatic analysis of documents using a machine learning model trained with annotated documents. And the learning mode includes: receiving and storing non-annotated documents; updating a descriptor, stored in association with the non-annotated documents, with information relating to a prediction, in accordance with the model used in production mode, for the automatic analysis of the non-annotated documents; sampling the stored non-annotated documents whose descriptor has been updated in accordance with the model used in production mode, and determining an order, in accordance with the information relating to the automatic analysis prediction, of the sampled non-annotated documents for annotation by an oracle; distributing the annotated documents between documents to be used in training mode for training at least one candidate machine learning model and documents to be used in validation mode for comparing the performance of the at least one candidate machine learning model with the model used in production mode; training the (at least one) randomly structured candidate machine learning model, and when the trained candidate machine learning model exhibits better performance in terms of validation than the model used in production mode, replacing the model used in production mode with a model corresponding to the trained candidate machine learning model and reiterating by updating the descriptor in accordance with the replacement model.

The user (in production mode) thus always has the best available model for his automatic analysis task. The model that is used is continually and automatically improved, and the distribution of the annotated documents between training and validation is carried out automatically when new annotated documents are available.

According to one particular embodiment, the method includes: upon replacement of the model used in production mode, interrupting any ongoing operation regarding the updating of the descriptors and the sampling in accordance with the replaced model.

According to one particular embodiment, the method includes: performing preprocessing upon receiving the non-annotated documents, which retrieves activation maps that are obtained using a pre-trained portion that is common to the machine learning models and that is applied to the received non-annotated documents, and writes, to the descriptors associated with the non-annotated documents, embeddings resulting from the pre-trained portion.

According to one particular embodiment, the method includes: creating multiple training instances that operate in parallel so as to train machine learning models of different random structures.

According to one particular embodiment, the method includes: creating multiple automatic analysis instances that operate in parallel with the model used in production mode, so as to distribute operations of updating the descriptors in learning mode and operations of responding to requests for the automatic analysis of documents in production mode.

According to one particular embodiment, the method is such that the formation of the order moves forward the more the already ordered documents are considered to be annotated so as to update a diversity contribution in an informativeness and uncertainty score.

According to one particular embodiment, when a document is newly annotated with an annotation A, the method comprises: computing a first score that takes account of the proximity between a setpoint ratio R and the current ratio for this annotation A, the ratios being representative of the number of annotated documents used in validation mode in comparison with the total number of annotated documents; computing a second score relating to the lack of representation of the annotation A in the documents used in validation mode; determining whether the newly annotated document should be used in training mode or in validation mode on the basis of these first and second scores.

According to one particular embodiment, the automatic analysis is a classification.

What is also proposed is a computer program able to be stored on a medium and/or downloaded from a communication network, in order to be read by a processor. This computer program comprises instructions for implementing the abovementioned method in any one of its embodiments, when the program is executed by the processor. What is also proposed is an information storage medium storing such a computer program.

What is also proposed is an active learning and automatic analysis system including electronic circuitry configured so as to execute a learning mode and a production mode in parallel, the production mode including: responding to requests for the automatic analysis of documents using a machine learning model trained with annotated documents. And the learning mode includes: receiving and storing non-annotated documents; updating a descriptor, stored in association with the non-annotated documents, with information relating to a prediction, in accordance with the model used in production mode, for the automatic analysis of the non-annotated documents; sampling the stored non-annotated documents whose descriptor has been updated in accordance with the model used in production mode, and determining an order, in accordance with the information relating to the automatic analysis prediction, of the sampled non-annotated documents for annotation by an oracle; distributing the annotated documents between documents to be used for training at least one candidate machine learning model and documents to be used for comparing the performance of the at least one candidate machine learning model with the model used in production mode; training the at least one randomly structured candidate machine learning model, and when the trained candidate machine learning model exhibits better performance in terms of validation than the model used in production mode, replacing the model used in production mode with the trained candidate machine learning model and reiterating by updating the descriptor in accordance with the replacement model.

BRIEF DESCRIPTION OF THE DRAWINGS

The abovementioned features of the invention, along with others, will become more clearly apparent upon reading the following description of at least one exemplary embodiment, the description being given with reference to the appended drawings, in which:

FIG. 4 schematically illustrates a classifier algorithm used in the modular architecture from FIG. 1;

FIG. 5 schematically illustrates a sampler algorithm used in the modular architecture from FIG. 1;

FIG. 6 schematically illustrates an algorithm for distributing annotated documents in the dedicated database; and FIG. 7 schematically illustrates an algorithm for constructing and evaluating a new artificial neural network model intended to replace a model currently being used by the classifier.

DETAILED DESCRIPTION OF THE PREFERRED EMBODIMENTS

The invention relates to one and the same system that implements a learning mode and a production mode for the automatic analysis of documents in parallel using machine learning technology. The automatic analysis may be classification, information extraction, automatic speech transcription, etc.

For the sake of illustration, the remainder of the description is described in the context of automatic analysis in the form of classification and therefore adopts the detailed example of an active learning and classification system 100 based on artificial neural networks. However, other automatic analysis tasks may be carried out in a similar manner, and other machine learning models may be used, such as for example support vector machines SVM.

Figure 1:
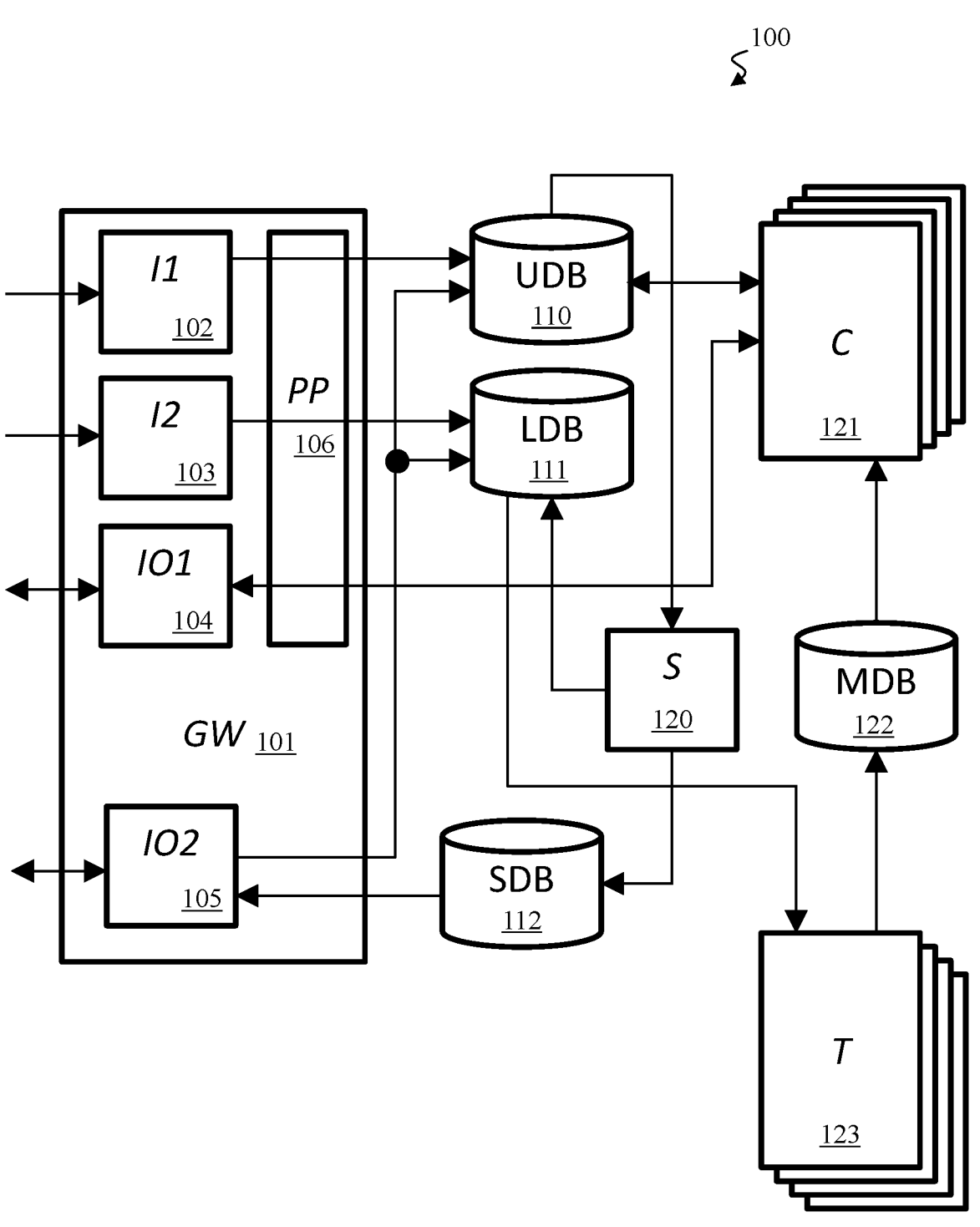
FIG. 1 schematically illustrates a modular architecture of an active learning system.

FIG. 1 thus schematically illustrates a modular architecture of the active learning and classification system 100, which executes a learning mode and a production mode in parallel. In other words, the active learning and classification system 100 continuously provides learning services and classification services on demand.

The active learning and classification system 100 includes a gateway GW 101 for interacting with the environment outside the system.

The gateway GW 101 thus comprises a first input interface I1 102 intended to receive non-annotated documents for the active learning of the system (learning mode).

The gateway GW 101 also comprises a second input interface I2 103 intended to receive already annotated documents for the active learning of the system (learning mode).

The gateway GW 101 also comprises a first input/output interface IO1 104 intended to receive documents to be classified using the most up-to-date artificial neural network model available and intended to provide a classification result for the documents in question (production mode).

The gateway GW 101 also comprises a second input/output interface IO1 105 intended to submit documents to be annotated (i.e., to be classified manually) to an oracle and intended to receive an instruction from the oracle in return (learning mode). The instruction may be to annotate the submitted document in a particular way, or to remove the document from the system. In the latter case, this means that the oracle considers the document not to be relevant for the desired learning.

The gateway GW 101 also preferably comprises a preprocessing module PP 106. The non-annotated documents received via the first input interface I1 102 are processed by the preprocessing module PP 106. The annotated documents received via the second input interface I2 103 may be processed by the preprocessing module PP 106.

In one particular embodiment, the preprocessing module PP 106 is based on an artificial neural network. An artificial neural network is typically formed by an input layer for injecting documents at input, an output layer for providing classification results for the documents injected at input, and, between them, hidden layers where the computation is performed so as to enable the classification. Each hidden layer applies filters to its inputs in order to obtain activation maps (or feature maps) that are used at input of the following layer. In each layer, multiple filters may be daisy-chained. For example, a layer L may apply a convolutional filter to the output of the activation map from the previous layer L−1 so as to obtain a first activation map, and apply a subsampling filter so as to obtain a second activation map from the first activation map, which is then provided at output to the following layer L+1. Thus, by successively applying filters to documents injected at input, the artificial neural network analyses the documents, and for example classifies them.

The configuration of the hidden layers of each artificial neural network model used in the context of the active learning and classification system 100 may be distributed into a pre-trained portion and a self-trained portion. The pre-trained portion is the same for all of the artificial neural network models used in the context of the active learning and classification system 100. It is typically supplied by the artificial intelligence system supplier, and corresponds to generic learning for the field of use of the active learning and classification system 100: types of object to be recognized in images, types of text to be classified, etc. The rest of the learning is then a specialization of the desired automatic analysis (for example models of boat to be recognized in satellite images, etc.), and is then performed by the end user of the active learning and classification system 100. The end user may thus easily perform active learning without being an expert in the field and without having to disclose documents necessary for training or validation and that might have a confidential nature to the artificial intelligence system supplier.

In one particular embodiment, the preprocessing module PP 106 has an artificial neural network designed to allow it to recover the activation maps from the pre-trained portion and to derive therefrom an embedding. These embeddings result from transpositions (or mapping) of input documents to small vectors of continuous numbers. This approach makes it possible to reduce the dimensionality of category-based variables, as are contained in the input documents, and the vector space provides an effective tool for searching for similarities.

The preprocessing module PP 106 is then configured so as to associate, with the documents provided thereto at input, the embeddings resulting from the pre-trained portion. Reference is made here to "fixed" embeddings. This makes it possible to speed up the updating, as described below, of descriptors stored together with the documents in question, and to speed up training using the pre-trained portion.

The preprocessing module PP 106 is furthermore preferably configured so as also to process documents to be classified that are received via the first input/output interface IO1 104. This thus allows a classifier C 121, described below and used in parallel for the learning and production modes, to focus only on the self-trained portion.

The active learning and classification system 100 furthermore comprises a storage space intended to store documents provided via the input interfaces I1 102 and I2 103 and associated information, such as descriptors, and to store the model to be used for the classification (production mode) and potentially a history of the models used previously by the active learning and classification system 100.

According to a first example, as illustrated in FIG. 1, this storage space takes the form of an assembly comprising a first database UDB 110, a second database LDB 111, a third database SDB 112 and a fourth database MDB 122. The first database UDB 110 is intended to store the non-annotated documents provided via the input interface I1 102 and that have not been submitted for annotation by the oracle. The second database LDB 111 is intended to store the annotated documents, that is to say, those provided via the input interface I2 103 and those that have been annotated by the oracle. The third database SDB 112 is intended to store the sampled documents, from among the non-annotated documents from the first database UDB 110, which are ordered for potential submission to the oracle. The fourth database MDB 122 is intended to store the model to be used for the classification (production mode), that is to say, the best available model, and potentially the history of models used previously by the active learning and classification system 100. The fourth database MDB 122 may store additional information in association with the history of previously used models, such as, for example, information about the performance achieved with such annotated documents as validation set.

According to a second example, the first database UDB 110, the second database LDB 111 and the third database SDB 112 may form a single database storing all of the documents provided via the input interfaces I1 102 and I2 103, therefore whether or not they are annotated. A set of flags or variables is then associated with each document. A flag may indicate whether or not the document is annotated. If the document is non-annotated, another flag may indicate whether it has been sampled and is pending submission to the oracle. If the document is annotated, yet another flag may indicate whether the document should be used for the training or the validation of artificial neural networks.

The active learning and classification system 100 furthermore comprises a sampler S 120. The sampler S 120 is configured so as to take non-annotated documents from the first database UDB 110 and to order them in the third database SDB 112 in accordance with a document informativeness and automatic analysis uncertainty (for example classification) score. The informativeness is linked to the representativeness in comparison with the non-annotated documents and/or the diversity in comparison with the annotated documents. The informativeness represents a degree of contribution of experience to the learning by the document under consideration. In this regard, the informativeness could also include the automatic analysis uncertainty. The decision has been taken here to consider the automatic analysis uncertainty to be a separate criterion from the informativeness.

Thus, when the oracle is available, documents to be annotated are submitted to him via the input/output interface IO2 105, in the order established by the sampler S 120. The oracle annotates the documents, that is to say, that the oracle classifies them manually, or instructs that they be removed from the active learning and classification system 100 and in particular from the first database UDB 110. Calling upon the oracle thus advances the learning effectively, by obtaining a supervised annotation for documents that have been chosen for their ability to advance the artificial neural network models or by excluding documents that are not relevant to the desired classification and that therefore distract the learning from its objective.

Figure 2:
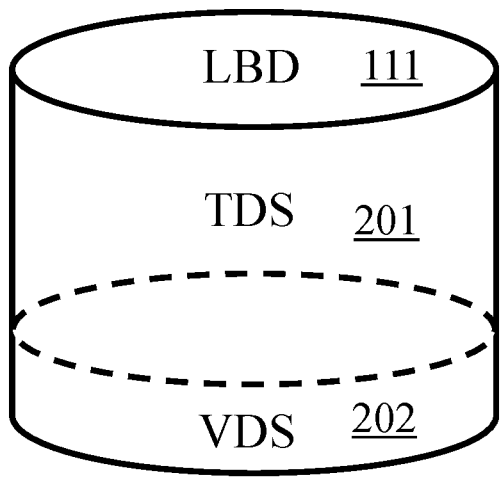
FIG. 2 schematically illustrates a distribution of annotated documents in a dedicated database.

The sampler S 120 is furthermore configured so as to distribute the annotated documents, in the second database LDB 111, between documents to be used for training and documents to be used for validation. Thus, as illustrated schematically in FIG. 2, the second database LDB 111 comprises a first set TDS 201 of annotated documents that are assigned to training artificial neural networks, and a second set VDS 202 of annotated documents that are assigned to validating trained artificial neural networks. The sampler S 120 decides to assign the annotated documents to training or to validation. The sampler S 120 may go back on a decision to assign an annotated document to validation in order to transfer it to training. However, the opposite situation is not desirable, since an artificial neural network model that has been trained with an annotated document is advantageous in terms of performance if this annotated document is used during validation.

The active learning and classification system 100 furthermore comprises at least one trainer T 123. The trainer T 123 is configured so as to train at least one randomly structured artificial neural network using the first set TDS 201 of annotated documents from the second database LDB 111. The trainer T 123 is furthermore configured so as to compare the performance of the best available model (the one used in production mode, that is to say, the last one stored in the fourth database MDB 122) with the performance of each randomly structured artificial neural network that has been trained. The trainer T 123 is configured so as to evaluate this performance, in terms of classification, using the second set VDS 202 of annotated documents from the second database LDB 111. The trainer T 123 is configured so as to update the fourth database MDB 122 when the newly trained artificial neural network model exhibits better performance than the best possible obtained until present, that is to say, the one used in production mode.

The trainer T 123 may be a set of training instances that operate in parallel and that train artificial neural networks of different random structures. Multiple alternative models may thus be evaluated concurrently.

It should be noted that the evaluation of the performance by the trainer T 123 for various artificial neural network models is based on the same set of validation documents. In other words, as soon as the second set VDS 202 of annotated documents has been updated, the performance of the best possible model as used in production should be re-evaluated with the updated second set VDS 202 of annotated documents, such that the comparison with one or more newly trained randomly structured artificial neural network models is meaningful.

The active learning and classification system 100 furthermore comprises at least one classifier C 121. The classifier C 121 is configured so as to use, whether in production mode or in learning mode, an artificial neural network configured in accordance with the best available model, that is to say, the one provided last in the fourth database MDB 122. In learning mode, the classifier C 121 is responsible for computing the embeddings, in accordance with the best available model, of the non-annotated documents stored in the first database UDB 110 and to accordingly update their descriptors, which are stored together with the documents in question. When the preprocessing module PP 106 has provided fixed embeddings, the classifier C 121 is responsible for computing what are called dynamic embeddings, which correspond to the moving portion of the model that is used. These descriptors then include information (such as a time-stamped identifier) representative of the model that was used to compute them and information relating to a classification prediction (more generally automatic analysis prediction) made by the classifier C 121 for the non-annotated documents. This information relating to the prediction is preferably the computed embeddings, the classification (more generally, the analysis result) that is obtained and corresponding uncertainty (for example entropy) information. These descriptors furthermore make it possible to include the abovementioned flags.

If the preprocessing module PP 106 is configured so as to associate, with the documents provided thereto at input, the fixed embeddings resulting from the already mentioned pre-trained portion, which is common to all of the models used, the classifier C 121 is responsible for computing the dynamic embeddings resulting from the self-trained portion (which differs from one model to another).

The classifier C 121 is configured so as to classify (production mode) documents that might be submitted via the input/output interface IO1 104. The active learning and classification system 100 thus provides, on demand, a classification of (intrinsically non-annotated) documents using the best available model.

The classifier C 121 may be a set of classification instances that operate in parallel with one and the same artificial neural network model so as to distribute the automatic analysis tasks to be carried out in learning mode and in production mode. For example, multiple instances distribute the operations of updating the descriptors (blank descriptors of new documents, descriptors rendered obsolete through the use of a new model in production mode) in the first database UDB 110, and are requisitioned in turn to process classification requests submitted via the input/output interface IO1 104. According to another example, a first instance may be responsible for responding to external requests submitted via the input/output interface IO1 104, a second instance may be responsible for updating the descriptors from a portion of the first database UDB 110 and at least one third instance may be responsible for updating the descriptors from the rest of the first database UDB 110.

When a new better-performing model is available in the fourth database MDB 122, the trainer is configured so as to send a corresponding notification to the classifier C 121, in order to interrupt any operation of updating descriptors that might be in progress and to trigger updating of the descriptors associated with the non-annotated documents in the first database UDB 110 in accordance with the new model, and to the sampler S 120 in order to resume sampling with non-annotated documents whose associated descriptors have been updated in accordance with the new model. When a new annotated document is added to the system, whether via the input interface I2 103 or via the input/output interface IO2 105, the gateway GW 101 sends a corresponding notification to the sampler S 120 so that this new annotated document is assigned to training or to validation.

The abovementioned notifications and the exchanges between the modules (databases, etc.) of the active learning and classification system 100 may be carried out in accordance with a proprietary protocol or in accordance with a standard protocol. For example, a message broker mechanism may be used.

In one exemplary embodiment, the artificial neural networks used by the active learning and classification system 100 are convolutional neural networks CNN. This type of artificial neural network is particularly suitable for the classification of image documents. In another exemplary embodiment, for example for information extraction or automatic speech transcription, the artificial neural networks used by the active learning and classification system 100 are recurrent neural networks RNN. This type of artificial neural network is particularly suitable for the classification of text documents. The artificial neural networks used by the active learning and classification system 100 may be integrated into the active learning and classification system 100 or be made available to the active learning and classification system 100 by an external computing system.

The active learning and classification system 100 is an active learning and automatic analysis system intended for classification operations. As already indicated, the parallelization of the active learning and production modes is applicable to other machine learning tasks, such as for example to information extraction.

Figure 3:
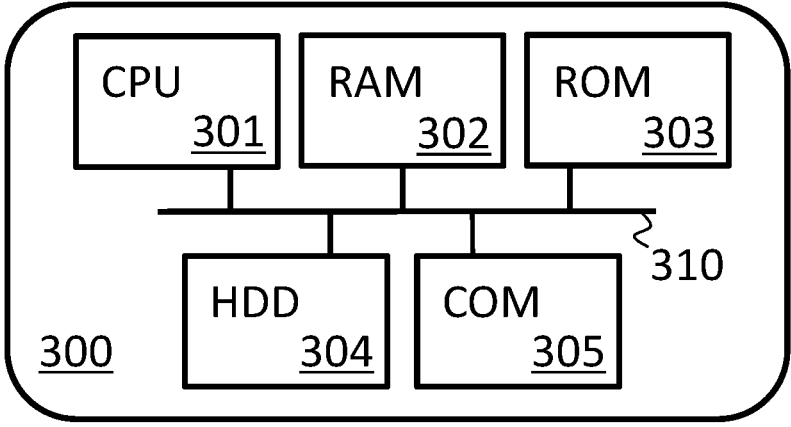
FIG. 3 schematically illustrates an exemplary hardware architecture for implementing the modular architecture from FIG. 1.

FIG. 3 schematically illustrates an exemplary hardware architecture for implementing the modular architecture from FIG. 1. The active learning and classification system 100 then comprises the following, connected by a communication bus 310: a processor or CPU (central processing unit) 301, or a cluster of such processors, such as for example GPUs (graphics processing units); a random access memory RAM 302; a read-only memory ROM 303, or a rewritable EEPROM (electrically erasable programmable ROM) memory, for example of flash type; a data storage device, such as a hard disk drive HDD 304, or a storage medium reader, such as an SD (for secure digital) card reader; a set of input and/or output interfaces, such as communication interfaces 305, in particular allowing the active learning and classification system 100 to receive annotated and non-annotated documents and to interact with the oracle.

The processor 301 is capable of executing instructions loaded into the RAM 302 from the ROM 303, from an external memory (not shown), from a storage medium, such as an SD card or the hard disk drive HDD, or from a communication network. When the active learning and classification system 100 is powered on, the processor 301 is capable of reading instructions from the RAM 302 and executing them. These instructions form a computer program that causes the processor 301 to implement the steps, behaviors and algorithms described here.

All or some of the steps, behaviors and algorithms described here may thus be implemented in software form by executing a set of instructions by way of a programmable machine, such as a DSP (digital signal processor) or a processor, or be implemented in hardware form by a machine or a dedicated component (chip), such as an FPGA (field-programmable gate array) or an ASIC (application-specific integrated circuit). In general, the active learning and classification system 100 comprises electronic circuitry designed and configured so as to implement the steps, behaviors and algorithms described here.

FIG. 4 schematically illustrates an algorithm, implemented by the classifier C 121, for deriving information, from the non-annotated documents, able to be used by the sampler S 120 to order the documents to be submitted to the oracle for annotation.

In a step 401, the classifier C 121 configures an artificial neural network by loading the last validated and available model in the fourth database MDB 122, that is to say, the best model obtained by the trainer T 123 until present.

In a step 402, the classifier C 121 runs through the non-annotated documents in the first database UDB 110 and predicts a classification for these documents using the loaded model. In the course of this prediction, the classifier C 121 also computes the embeddings of the documents in question. When the preprocessing module PP 106 has provided fixed embeddings, the classifier C 121 computes the dynamic embeddings.

In a step 403, the classifier C 121 evaluates a prediction uncertainty (for example entropy) for each non-annotated document for which a classification prediction has been performed using the last validated model.

In a step 404, the classifier C 121 updates the descriptor associated with each non-annotated document for which a classification prediction has been performed using the last validated model. The descriptors comprise information representative of the model used for updating the descriptors (i.e., the model loaded in step 401). The descriptors comprise information relating to a classification prediction made by the classifier C 121 for the non-annotated documents. The descriptors thus preferably comprise the embeddings obtained in accordance with the artificial neural network model to which the descriptors refer, the classification (more generally the automatic analysis result) that is obtained, and information about the automatic analysis uncertainty (for example entropy) evaluated in step 403. The descriptors may comprise the abovementioned flags.

The algorithm of FIG. 4 is repeated for as long as the first database contains at least one non-annotated document whose associated descriptor is not up-to-date by applying the last model validated by the trainer T 123 and made available to the classifier C 121 in the fourth database MDB 122. The algorithm of FIG. 4 is thus triggered when one or more non-annotated documents are provided via the input interface I1 102.

The algorithm of FIG. 4 is interrupted when a new better-performing model has been validated by the trainer T 123 and made available to the classifier C 121 in the fourth database MDB 122. The algorithm of FIG. 4 is then reinitialized and relaunched so as to update the descriptors of the non-annotated documents with the new model.

The descriptors updated by applying the algorithm of FIG. 4 are used by the sampler S 120 to select which non-annotated documents to submit to the oracle for annotation, and in which order. This aspect is described below with reference to FIG. 5.

Besides updating the descriptors, the classifier C 121 responds to the classification requests submitted via the input/output interface IO1 104, while also using the best model made available by the trainer T 123. The training and production modes are thus executed in parallel with the same artificial neural network model as reference (the one made available last by the trainer T 123).

FIG. 5 schematically illustrates a sampling algorithm, implemented by the sampler S 120.

In a step 501, the sampler S 120 selects non-annotated documents from the first database UDB 110, the descriptor of which is up-to-date in accordance with the last model made available by the trainer T 123. Specifically, active learning is characterized by a specific search for documents that are most informative for the model under construction, rather than performing training on all available non-annotated documents, in order to reduce the cost of supervision operations.

In a step 502, the sampler S 120 computes an informativeness and uncertainty score for each document selected in step 501. This score is representative of the informativeness of the document and of the uncertainty of the classification prediction performed by the classifier C 121. The informativeness of the document corresponds to its representativeness in comparison with the non-annotated documents (for example, computed in the form of the average similarity to its hundred closest neighbors among the non-annotated documents) and/or its diversity in comparison with the non-annotated documents (for example, computed in the form of a distance to the nearest neighbor among the annotated documents).

This score thus varies in a manner inversely proportional to a similarity distance, average cosine, with the other non-annotated documents. This score therefore varies in a manner proportional to an information diversity offered in comparison with the already annotated documents (for example, penalization for proximity to the annotated documents). And this score varies in a manner proportional to the classification prediction uncertainty (indicated in the descriptor). For example, the sampler S 120 takes account of entropy when computing the score. Specifically, in machine learning, entropy is widely used as a measure of uncertainty. The higher the entropy, the greater the uncertainty with regard to the obtained classification.

In a step 503, the sampler S 120 orders the non-annotated documents in the third database SDB 112 on the basis of their informativeness and uncertainty scores computed in step 502. Copies of the documents, or their identifiers, are enough to be supplied to the third database SDB 112.

The non-annotated documents are then presented to the oracle for annotation, with decreasing values of the informativeness and uncertainty score.

In one particular embodiment, starting from the 2nd rank of the order, the sampler S 120 takes account of each previous document in the order to determine a diversity contribution in the informativeness and uncertainty score. In other words, the further the sampler S 120 progresses in the formation of the order, the more the sampler S 120 considers that the already ordered documents are "annotated" so as to update this diversity contribution in the informativeness and uncertainty score. This avoids virtually identical documents following one another in the order to be presented to the oracle. This makes it possible to boost performance in spite of the simultaneous nature of the sampling and of the annotation.

The algorithm of FIG. 5 is repeated for as long as the first database contains at least one non-annotated document that has not been classified in the third database SDB 112. The algorithm of FIG. 5 is thus triggered when one or more non-annotated documents are provided via the input interface I1 102 and when the classifier C 121 has updated their respective descriptors.

The algorithm of FIG. 5 is interrupted when a new better-performing model has been validated by the trainer T 123 and made available to the classifier C 121 in the fourth database MDB 122. The algorithm of FIG. 5 is then reinitialized and relaunched so as to sample documents from among the non-annotated documents from the first database UDB 110 whose descriptors have been updated with the new model by the classifier C 121.

FIG. 6 schematically illustrates an algorithm for distributing annotated documents in the dedicated database, implemented by the sampler S 120. Specifically, the sampler S 120 is also responsible for distributing the annotated documents between the first set TDS 201, which is used for training, and the second set VDS 202, which is used for validation.

In a step 601, the sampler S 120 receives a notification indicating that a new annotated document is available, received either via the input interface I2 103 or via the input/output interface IO2 105 following an annotation by the oracle. The notification is therefore, for example, sent by the gateway GW 101.

In a step 602, the sampler S 120 decides whether the annotated document is assigned to training or to validation. The sampler S 120 applies pre-established rules for this purpose. For example, the sampler S 120 seeks to obtain a set of annotated documents for validation that is balanced in terms of class representation. According to another example, the sampler S 120 distributes the annotated documents on a rolling basis, complying with a predetermined balance setpoint between documents assigned to validation and documents assigned to training. The sampler S 120 thus constructs, on-the-fly and automatically, a set of documents used for training and a set of documents used for validation.

In one particular embodiment, and in order to guarantee the balancing of the validation set, the sampler S 120 is configured with a hyperparameter R that represents a setpoint for the level of annotated documents assigned to validation in comparison with all of the available annotated documents. When a new document is annotated with an annotation A (for example class), the sampler S 120 computes a first score that takes account of the proximity between the setpoint ratio R and the current ratio for this annotation A. The sampler S 120 computes another score relating to the lack of representation of the annotation A in the validation set in order for it to be balanced. The sampler S 120 determines the assignment between training and validation on the basis of these two scores, for example by considering their product in comparison with a predefined threshold.

In one particular embodiment, when the annotations are not necessarily mutually exclusive, the sampler S 120 takes account, when computing the above scores, of the population of annotated documents with the annotation A, but also of the population of annotated documents with another annotation that is not mutually exclusive with the annotation A.

In one particular embodiment, the sampler S 120 takes account of the diversity of the validation set or of the representativeness of the validation set in comparison with all of the annotated documents.

In a step 603, the sampler S 120 updates a descriptor associated with the annotated document in the second database LDB 111. The descriptor indicates whether the document has been assigned to training or to validation.

The sampler S 120 thus automatically makes two separate sets of documents available to the trainer T 123, allowing it respectively to self-train and to self-evaluate alternative artificial neural network structures in order to continually seek to find a better classification model.

FIG. 7 schematically illustrates an algorithm, implemented by the trainer T 123, for constructing and evaluating a new artificial neural network model (learning mode) intended to replace a model currently being used by the classifier C 121 (production mode).

In a step 701, the trainer T 123 instantiates an artificial neural network with the last validated model.

In a step 702, the trainer T 123 instantiates another, randomly structured, artificial neural network. This other artificial neural network is a candidate to replace the last validated model. This other artificial neural network may include the abovementioned pre-trained portion (the rest of the structure then being random) in order to speed up training thereof.

In a step 703, the trainer T 123 trains the candidate artificial neural network with the annotated documents from the first set TDS 201 from the second database LDB 111.

In a step 704, the trainer T 123 validates the artificial neural network with the last validated model, instantiated in step 701, using the annotated documents from the second set VDS 202 from the second database LDB 111. The trainer T 123 also validates the candidate artificial neural network, trained in step 702, using the same annotated documents from the second set VDS 202 from the second database LDB 111. If the candidate artificial neural network exhibits better performance during validation, the trainer T 123 stores a corresponding model in the fourth database MDB 122 as a replacement for the previous model. If not, the trainer T 123 may wait for new annotated documents to be assigned to training or to validation in order to evaluate whether continuing the learning might lead to a better model. As an alternative, the trainer T 123 may randomly draw a new artificial neural network structure as new candidate.

The trainer T 123 preferably applies decision rules concerning whether or not to continue training an artificial neural network, so as in particular not to loop back forever to a candidate that would not provide an improvement or not to perform overfitting. For example, the trainer T 123 applies validation-based early stopping rules, which may combine criteria for the number of training steps carried out and the number of learning rounds, called epochs. An epoch therefore corresponds to use of all of the annotated documents dedicated to training.

As already mentioned, the trainer T 123 may train and evaluate multiple artificial neural network structures in parallel.

On initialization of the active learning and classification system 100, no model has been validated. The trainer T 123 starts training an arbitrarily or randomly structured artificial neural network and makes it available to the classifier C 121 when the classification performance stops improving for a predefined number of training steps, or when the variation in classification performance from one training step to another is less than a predefined threshold, when the classification performance has reached a predefined threshold. The input interface I2 103 is used to inject a start of a set of annotated documents so as to allow starting of the active learning and classification system 100. For as long as no model has been validated, the sampler S 120 presents the non-annotated documents for annotation by the oracle in a random order in the database.

The input interface I2 103 is also used when at least one new class has to be learned. In this case, documents classified into this new class and annotated accordingly are injected via the input interface I2 103. The impact on learning is then great enough for a new better-performing model to be made available quickly by the trainer T 123, even though this model is then successively improved by refining the learning with regard to this new class.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method implemented by an active learning and automatic analysis system, the method executing a learning mode and a production mode in parallel, the production mode comprising:

responding to requests for the automatic analysis of documents using a machine learning model trained with annotated documents; and the learning mode comprising:

receiving and storing non-annotated documents;

updating a descriptor, stored in association with the non-annotated documents, with information relating to a prediction, in accordance with the model used in production mode, for the automatic analysis of the non-annotated documents;

sampling the stored non-annotated documents whose descriptor has been updated in accordance with the model used in production mode, and determining an order, in accordance with the information relating to the automatic analysis prediction, of the sampled non-annotated documents for annotation by an oracle;

distributing the annotated documents between documents to be used in training mode for training at least one candidate machine learning model and documents to be used in validation mode for comparing the performance of the at least one candidate machine learning model with the model used in production mode; and training the at least one randomly structured candidate machine learning model, and when the trained candidate machine learning model exhibits better performance in terms of validation than the model used in production mode, replacing the model used in production mode with the trained candidate machine learning model and reiterating by updating the descriptor in accordance with the replacement model, and, wherein, when a document is newly annotated with an annotation A, the method comprises:

computing a first score that takes account of the proximity between a setpoint ratio R and the current ratio for this annotation A, the ratios being representative of the number of annotated documents used in validation mode in comparison with the total number of annotated documents;

computing a second score relating to the lack of representation of the annotation A in the documents used in validation mode; and determining whether the newly annotated document should be used in training mode or in validation mode on the basis of these first and second scores.

2. The method according to claim 1, further comprising:

upon replacement of the model used in production mode, interrupting any ongoing operation regarding the updating of the descriptors and the sampling in accordance with the replaced model.

3. The method according to claim 1, further comprising: performing preprocessing upon receiving the non-annotated documents, which retrieves activation maps that are obtained using a pre-trained portion that is common to the machine learning models and that is applied to the received non-annotated documents, and writes, to the descriptors associated with said non-annotated documents, embeddings resulting from the pre-trained portion.

4. The method according to claim 1, further comprising: creating multiple training instances that operate in parallel so as to train machine learning models of different random structures.

5. The method according to claim 1, further comprising: creating multiple automatic analysis instances that operate in parallel with the model used in production mode, so as to distribute operations of updating the descriptors in learning mode and operations of responding to requests for the automatic analysis of documents in production mode.

6. The method according to claim 1, wherein the formation of the order moves forward the more the already ordered documents are considered to be annotated so as to update a diversity contribution in an informativeness and uncertainty score.

7. The method according to claim 1, wherein the automatic analysis is a classification.

8. A computer program product comprising instructions for implementing the method according to claim 1, when said instructions are executed by a processor.

9. A non-transitory storage medium storing a computer program comprising instructions for implementing the method according to claim 1, when said instructions are read from the information storage medium and executed by a processor.

10. An active learning and automatic analysis system including electronic circuitry configured so as to execute a learning mode and a production mode in parallel,
    the production mode comprising:
        responding to requests for the automatic analysis of documents using a machine learning model trained with annotated documents;

the learning mode including:
    receiving and storing non-annotated documents;
    updating a descriptor, stored in association with the non-annotated documents, with information relating to a prediction, in accordance with the model used in production mode, for the automatic analysis of said non-annotated documents;
    sampling the stored non-annotated documents whose descriptor has been updated in accordance with the model used in production mode, and determining an order, in accordance with the information relating to the automatic analysis prediction, of the sampled non-annotated documents for annotation by an oracle;
    distributing the annotated documents between documents to be used for training at least one candidate machine learning model and documents to be used for comparing the performance of said at least one candidate machine learning model with the model used in production mode;
    training said at least one randomly structured candidate machine learning model, and when the trained candidate machine learning model exhibits better performance in terms of validation than the model used in production mode, replacing the model used in production mode with the trained candidate machine learning model and reiterating by updating the descriptor in accordance with the replacement model,
wherein, when a document is newly annotated with an annotation A, the electronic circuitry is further configured to:
compute a first score that takes account of the proximity between a setpoint ratio R and the current ratio for this annotation A, the ratios being representative of the number of annotated documents used in validation mode in comparison with the total number of annotated documents;
compute a second score relating to the lack of representation of the annotation A in the documents used in validation mode; and
determine whether the newly annotated document should be used in training mode or in validation mode on the basis of these first and second scores.

* * * * *